(12) United States Patent
Hagiopol et al.

(10) Patent No.: US 7,488,403 B2
(45) Date of Patent: *Feb. 10, 2009

(54) BLENDS OF GLYOXALATED POLYACRYLAMIDES AND PAPER STRENGTHENING AGENTS

(76) Inventors: Cornel Hagiopol, 1176 Mandalay Ct., Lilburn, GA (US) 30047; Yuping Luo, 430 Arborshade Trace, Duluth, GA (US) 30097; David F. Townsend, 1475 Roanoke Trace, Grayson, GA (US) 30017; James W. Johnston, 2572 Collins Port Cove, Suwanee, GA (US) 30024; Clay E. Ringold, 145 Michigan Ave., Decatur, GA (US) 30030; Karla D. Favors, 3323 Cedar Island Dr., Sw, Atlanta, GA (US) 30311

( * ) Notice: Subject to any disclaimer, the term of this patent is extended or adjusted under 35 U.S.C. 154(b) by 530 days.

This patent is subject to a terminal disclaimer.

(21) Appl. No.: 10/919,488

(22) Filed: Aug. 17, 2004

(65) Prior Publication Data

US 2006/0037727 A1    Feb. 23, 2006

(51) Int. Cl.
*D21H 17/55* (2006.01)
*C08F 8/00* (2006.01)
(52) U.S. Cl. .............. 162/168.3; 162/158; 162/164.3; 162/166; 525/328.3; 525/329.4; 525/383
(58) Field of Classification Search .............. 162/164.3, 162/166, 168.3; 525/328.3, 329.4, 383
See application file for complete search history.

(56) References Cited

U.S. PATENT DOCUMENTS

| 3,556,932 | A | 1/1971 | Coscia et al. |
|---|---|---|---|
| 3,773,612 | A | 11/1973 | Avis |
| 4,060,507 | A | 11/1977 | Floyd et al. |
| 4,217,425 | A | 8/1980 | Ballweber et al. |
| 4,508,594 | A | 4/1985 | Jansma et al. |
| 4,603,176 | A | 7/1986 | Bjorkquist et al. |
| 4,605,702 | A | 8/1986 | Guerro et al. |
| 4,605,718 | A | 8/1986 | Jansma et al. |
| 4,785,055 | A | 11/1988 | Dexter et al. |
| 4,853,431 | A | 8/1989 | Miller |
| 4,954,538 | A | 9/1990 | Dauplaise et al. |
| 4,966,652 | A | 10/1990 | Wasser |
| 5,147,908 | A | 9/1992 | Floyd et al. |
| 5,401,810 | A | 3/1995 | Jansma et al. |
| 5,427,652 | A | 6/1995 | Darlington et al. |
| 5,466,337 | A | 11/1995 | Darlington et al. |
| 5,567,798 | A | 10/1996 | Dulany et al. |
| 5,674,362 | A | 10/1997 | Underwood et al. |
| 5,763,523 | A | 6/1998 | Chen et al. |
| 5,763,530 | A * | 6/1998 | Chen et al. .................. 524/521 |
| 5,783,041 | A | 7/1998 | Underwood |
| 5,869,589 | A | 2/1999 | Raynolds et al. |
| 5,883,181 | A | 3/1999 | Cicchiello et al. |
| 5,914,366 | A | 6/1999 | Cicchiello et al. |
| 5,951,719 | A | 9/1999 | Cooper et al. |
| 6,077,394 | A | 6/2000 | Spence et al. |
| 6,080,804 | A | 6/2000 | Davies et al. |
| 6,197,919 | B1 | 3/2001 | Crisp et al. |
| 6,306,480 | B1 * | 10/2001 | Yardley et al. .............. 428/121 |
| 6,380,353 | B1 | 4/2002 | Rupaner et al. |
| 6,429,253 | B1 | 8/2002 | Guerro et al. |
| 6,491,790 | B1 | 12/2002 | Proverb et al. |
| 7,119,148 | B2 * | 10/2006 | Hagiopol et al. ......... 525/327.1 |
| 2002/0134521 | A1 * | 9/2002 | Shannon et al. .......... 162/164.4 |

FOREIGN PATENT DOCUMENTS

WO   WO 97/30118        8/1997
WO   WO 00/11046 A1 *   3/2000

OTHER PUBLICATIONS

U.S. Appl. No. 11/136,730, filed May 25, 2005, Hagiopol et al.
U.S. Appl. No. 10/919,487, filed Aug. 17, 2004, Hagiopol et al.
U.S. Appl. No. 10/785,403, filed Feb. 25, 2004, Hagiopol et al.

* cited by examiner

*Primary Examiner*—Eric Hug
*Assistant Examiner*—Dennis Cordray

(57) ABSTRACT

Compositions comprising a blend of two or more paper strengthening agents have improved stability compared with previously known paper strengthening agents. One component is a polymeric paper strengthening agent, preferably a wet strengthening agent. The other component is a stabilized glyoxalated polyacrylamide prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide. If desired, an aldehyde scavenger can be included in one or more of step (1), step (2), step (3), or the stabilized glyoxalated polyacrylamide. Such compositions can be used to enhance the strength of paper, particularly the wet strength of paper.

31 Claims, No Drawings

BLENDS OF GLYOXALATED POLYACRYLAMIDES AND PAPER STRENGTHENING AGENTS

FIELD OF THE INVENTION

The invention relates to paper strengthening agents, particularly wet strengthening agents.

BACKGROUND OF THE INVENTION

Paper is sheet material containing interconnected small, discrete fibers. The fibers are usually formed into a sheet on a fine screen from a dilute water suspension or slurry. Paper typically is made from cellulose fibers, although occasionally synthetic fibers are used.

Paper products made from untreated cellulose fibers lose their strength rapidly when they become wet, i.e., they have very little wet strength. The wet strength of paper is defined as the resistance of the paper to rupture or disintegration when it is wetted with water. U.S. Pat. No. 5,585,456. Wet strength of ordinary paper is only about 5% of its dry strength. To overcome this disadvantage, various methods of treating paper products have been employed.

Wet strength resins applied to paper are either of the "permanent" or "temporary" type, which are defined by how long the paper retains its wet strength after immersion in water. While wet strength retention is a desirable characteristic in packaging materials, it presents a disposal problem. Paper products having such characteristics are degradable only under undesirably severe conditions. While some resins are known which impart temporary wet strength and thus would be suitable for sanitary or disposable paper uses, they often suffer from one or more drawbacks. For example, their wet strength is generally of a low magnitude (about one-half of the level achievable for permanent-type resins); they are easily attacked by mold and slime; or they can only be prepared as dilute suspensions.

There is a continuing need in the art for methods of imparting appropriate levels of wet strength to paper products.

DETAILED DESCRIPTION OF THE INVENTION

The present invention provides compositions for enhancing the strength of paper, particularly the wet strength of paper. The compositions comprise a blend of two or more paper strengthening agents and have improved stability compared with previously known paper strengthening agents.

Compositions of the invention comprise two components. One component is one or more polymeric paper strengthening agents, preferably wet strengthening agent(s). The other component is a stabilized glyoxalated polyacrylamide prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide. If desired, an aldehyde scavenger can be included in one or more of step (1), step (2), step (3), or the stabilized glyoxalated polyacrylamide. The stabilized glyoxalated polyacrylamide is present in a concentration of between about 40% and about 99% by weight of the two components. The final blend also can contain an aldehyde scavenger, which further enhances its stability.

Paper strengthened with some compositions of the invention can be defibered and repulped in neutral water without extraordinary processes. The interpolymer networks formed by the blend inside the paper readily break down during repulping. Other compositions of the invention can be used to impart greater strength to paper products whose breakdown in water is not desired.

The term "polymer" is used throughout this specification in its conventional sense to refer to compounds made from smaller monomers and having a molecular weight of about 500 to 1000 or higher. The term "monomer" is used herein to refer to compounds that are not polymeric and which can polymerize in order to generate a "polymer."

As used herein, "crosslinked" and similar terms are intended to embrace the structural and/or morphological change that occurs, for example, by covalent chemical reaction or ionic interaction between separate molecules in a composition.

Stabilized Glyoxalated Polyacrylamide

Preparation of Stabilized Glyoxalated Polyacrylamide Compositions

The stabilized glyoxalated polyacrylamide component of the disclosed blends is prepared by glyoxalating a base polyacrylamide according to the method described below. The base polyacrylamide, which is glyoxalated in accordance with the method outlined above, can be prepared by free radical polymerization of a base acrylamide monomer in an aqueous system using a chain transfer agent, such as 2-mercaptoethanol. Methods for making polyacrylamide polymers are well known in the prior art.

Base Acrylamide Monomer

A base acrylamide monomer provides the primary reaction sites on the base polymer backbone to which the glyoxal substituents are attached. The base polymer must have a sufficient number of base acrylamide monomers in its structure (pendant amide groups) so that, once functionalized with glyoxal, the resulting polymer is thermosetting. Generally, the amount of base acrylamide monomer should be at least about 10 mole percent based on the total number of monomers used to prepare the base polyacrylamide polymer. Higher amounts are usually preferred as this has a beneficial effect on the paper strengthening properties of the resulting polymer. As a result, the base acrylamide monomer is normally provided in an amount of at least about 50 mole percent and sometimes in excess of 75 mole percent of the total number of vinyl monomers from which the base polyacrylamide is prepared.

The term "base acrylamide monomer" is intended to embrace primary vinylamides including not only acrylamide itself but also substituted acrylamides such as methacrylamide, ethylacrylamide, crotonamide, N-methyl acrylamide, N-butyl acrylamide, N-ethyl methacrylamide and the like. Thus, polyacrylamides, which by definition are polymers made from acrylamide monomers, include repeating units from at least some of these various compounds.

Cationic Co-Monomer

In addition to the base acrylamide monomer, the reaction mixture also includes a sufficient amount of an unsaturated cationic co-monomer to provide the ultimate polyacrylamide polymer with a suitable cationic character for strengthening paper. The amount of cationic components preferably is sufficient to render the modified polyacrylamide polymer self-substantive to cellulose fibers in aqueous suspensions. The quantity of polymer retained on the cellulose fibers can be determined by measuring the nitrogen content of the fibers both before and after treatment with the polyacrylamide composition.

Typically, a few cationic monomers, and in some case a single monomer, in each base polymer molecule may be sufficient to provide the polymer with an adequate cationic character to make the polymer substantive to cellulose fibers. A polymer with a suitable amount of cationic character thus can usually be obtained by including at least about 0.001 mole of cationic monomer and upwards of 0.25 mole and possibly more of cationic monomer, per mole of acrylamide monomer in the reaction mixture. Usually an amount between 0.01 and 0.15 mole of cationic monomer per mole of acrylamide monomer should be satisfactory, with an amount between 0.02 and 0.10 being more typical.

Suitable co-monomers for conferring a cationic character to the base polyacrylamide polymer when dissolved in water include a diallyl quaternary monomer (generally diallyl dimethyl ammonium chloride, DADMAC), 2-vinylpyridine, 4-vinylpryridine, 2-methyl-5-vinyl pyridine, 2-vinyl-N-methylpyridinium chloride, p-vinylphenyl-trimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate, and mixtures thereof. In addition to chloride, the counterion for the cationic monomers also can be fluoride, bromide, iodide, sulfate, methylsulfate, phosphate and the like.

In order to prepare a polyacrylamide of a desired chemical composition and monomer distribution, the full complement of the cationic co-monomer(s) can be added all at once at the beginning of the polyacrylamide polymerization reaction. Alternatively, the cationic co-monomer(s) can be added continuously along with base acrylamide monomers over the time course of the polymerization reaction, or in yet another embodiment the full complement of the co-monomer(s) can be added all at once, but only after a certain conversion of base acrylamide to form a polyacrylamide homopolymer has occurred. Still other options for reacting the cationic co-monomer with the base acrylamide monomer/polyacrylamide polymer will be recognized by those skilled in the art.

Other Monomers

Other vinyl monomers that can be present during preparation of the base polyacrylamide and thus become incorporated into the base polymer include (1) diluter monomers, i.e., monomers that reduce the concentration of required monomers is each polymer but do not provide any functional site for modification of the polymer, and (2) other functional monomers, i.e., non-amide vinyl monomers that can be incorporated into the base polymer and have pendant groups that also may react with glyoxal.

Diluter monomers include, for example, acrylic esters such as ethyl acrylate, methylmethacrylate and the like, acrylonitrile, vinyl acetate, N-vinyl pyrrolidone, N,N'-dimethyl acrylamide, hydroxy alkyl (meth) acrylates, styrene and the like.

Functional monomers include, for example, allylglycidal ether, glycidyl methacrylate and the like. Of a special interest are those co-monomers with a 1,2-diol in their structure, such as 3-allyloxy-1,2-propandiol, 3-acryloyloxy-1,2-propandiol and methacryloyloxy-1,2-propandiol.

The diluter monomers can be present in the reaction mixture in an amount of up to about 0.5 mole per mole of acrylamide monomer, while the amount of functional monomers should not exceed about 0.15 mole per mole of acrylamide monomer. The amount and ratio of the diluter and functional monomers in the reaction mixture can be used as another control of the extent and distribution of glyoxalation.

Suitable base polymers, for example, can be prepared from a mixture of acrylamide and diallyldimethyl ammonium chloride in a molar ratio between 99:1 and 75:25.

In an alternative embodiment, a di-functional co-monomer can be used in order to obtain a branched polyacrylamide polymer structure. N,N'-methylene-bisacrylamide, N,N'-methylene-bismethacrylamide, N-allyl acrylamide and N-allyl methacrylamide are recommended as a di-functional co-monomers if a structure with added branching is desired.

Free Radical Polymerization

As noted above, the polyacrylamide is prepared by free radical polymerization among the base acrylamide monomers, the cationic monomers and the optional diluter, functional and di-functional monomers and is initiated using known free radical initiators. Commonly used free radical initiators that can be used include the various peroxides, t-butyl hydroperoxide, cumene hydroperoxide, benxoyl peroxide, t-butoxyperoxy hexanoate and various azo-compounds such as azodiisobutyronitrile (AIBN), azodiisobutyramidine dihydrochloride (AIBA) and dimethylazodiisobutyrate. Other useful initiators are the water-soluble compounds such as hydrogen peroxide and the sodium, potassium and ammonium persulfates used by themselves or in activated redox systems.

As well understood by those skilled in the art, the amount of initiator should be sufficient to yield an acceptable reaction rate and, in combination with the level of monomeric reactants and the chain transfer agent, as hereinbelow described, a polyacrylamide adduct (reaction product) of a suitable molecular weight to be water soluble. The amount of initiator, however, should not be so high as to result in an uncontrolled rate of reaction and possible gel formation. The amount of initiator used in the solution polymerization will generally be in the range of 0.01 to 3% by weight, based on the weight of the monomers, and is usually between about 0.2 and 2% by weight. The initiator can be charged at the outset of the polymerization, however, incremental addition of the initiator throughout polymerization can also be employed and may be advantageous in some circumstances. Additional amounts of initiator (introduced by itself or associated with a reducer) are used at the end of the reaction in order to consume any residual un-reacted monomers.

The polymerization proceeds nicely at a temperature broadly in the range of 30 to 100° C., more usually in the range of 60 to 90° C.

In some cases it also may be desirable to conduct the reaction in the presence of an aliphatic alcohol, such as about 4 to about 15 percent by weight of an aqueous reaction mixture of ethanol, isopropyl alcohol, n-propanol or butanol.

Chain Transfer Agent

Another constituent of the reaction system is a chain transfer agent. As understood by those skilled in the art, the chain transfer agent functions to limit or control the molecular weight of the polymer formed by the free radical polymerization reaction taking place between the monomeric reactants. Thus, a chain transfer agent preferably is used in an amount sufficient to limit the molecular weight to a desired endpoint for the specific application. The amount of the chain transfer agent should not be so high, however, that it so severely limits the molecular weight of the resulting adduct that the polymer has a poor paper strengthening property. In order to accomplish these objectives, the chain transfer agent will generally be included in the reaction mixture in the range of about 0.1 to 30% by weight, based on the weight of the monomers, and most often will be used in an amount between about 0.5 and 15% by weight. The determination of a suitable level of chain transfer agent to use in any monomer system is a matter of routine experimentation to those of ordinary skill in the art.

The chain transfer agent usually is charged into the reaction mixture at the outset of the polymerization, though it too may be added later in the reaction or in increments if desired. Any material that is able to control/limit the extent of the polymerization via chain transfer can be used as the chain transfer agent. Suitable chain transfer agents include allyloxypropane diol, thioglycol, and mercaptans such as 2-mercaptoethanol, hydroxyethyl-3-mercaptopropionate and dodecylmercaptan. By using the chain transfer agent, one is able to limit the molecular weight of the polymerized product.

As understood by those skilled in the art, free radical solution polymerization reactions can be conducted by charging a reactor with appropriate amounts of the various monomers, the chain transfer agent, and the free radical initiator. An amount of water (and an optional water miscible solvent) also is included in the reactor to provide a final solids concentration in the aqueous composition within the range of about 5 to about 50 weight percent. The solids concentration of the aqueous reaction mixture more usually is on the order of 10 to 45 weight percent.

Molecular weights of suitable base polyacrylamide polymers before glyoxalation typically fall within the range of 500 to 1,000,000, more usually in the range of 1000 to 100,000. It is preferred that the base polymer be water-soluble before glyoxalation. For the most part, base polyacrylamide polymers having a molecular weight of less than about 25,000 and especially less than 10,000 are normally preferred. The molecular weight of the base polyacrylamide is influenced by changing the reaction temperature, the level of solids in the reaction, changing the amount of initiator, changing the amount of chain transfer agent, and other methods used by those skilled in the art.

Glyoxalation

The so-prepared polyacrylamide polymer then is glyoxalated at an alkaline pH in the range of 7.2 to 10.0. The pH can be controlled using a buffer system. A buffer of mono- and di-sodium phosphate is suitable, though other buffers would include any material that simultaneously functions as both a weak acid and a weak base and is able to maintain the desired pH such as: monopotassium phosphate plus borax, sodium hydroxide plus a mixture of acetic, phosphoric and boric acids, disodium phosphate plus citric acid.

Glyoxal (CHOCHO) reacts with pendant amide groups on the polyacrylamide backbone (1) according to the following reaction to produce a polyacrylamide having a pendant glyoxalated group (2):

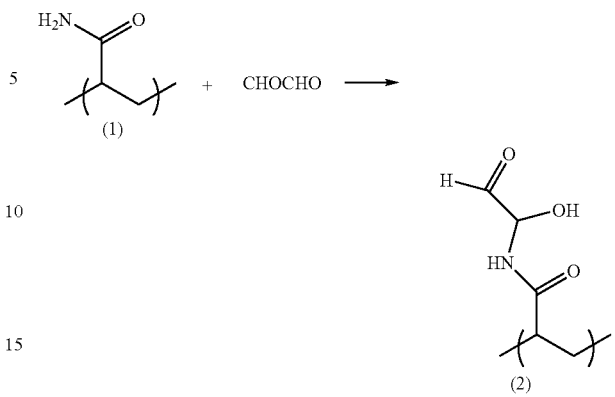

A second reaction involves the so-formed aldehyde moiety on the polymer backbone with another amide group, such as belonging to another macromolecule, and leads to building molecular weight and cross-linking.

To initiate the glyoxalation of the polyacrylamide, an amount of glyoxal to provide between about 10 to 60 mole percent glyoxal, based on the molar concentration of pendant amide groups and other optional glyoxal-reactive functional groups in the polyacrylamide, is added as the first of at least two separate portions to the polyacrylamide. Stated in another way, 1 to 6 glyoxals are supplied for every 10 pendant amide groups and other optional glyoxal-reactive functional groups in the polyacrylamide.

The glyoxalation of the cationic polyacrylamide usually is performed at a temperature of about 15° C. to about 50° C. and in an aqueous solution at a total solids concentration ranging from about 8 weight % to about 30 weight %.

The first portion of glyoxal is added to the polyacrylamide polymer in water to cause glyoxalation and some cross-linking between pendant amide and other glyoxal-reactive functional groups in the glyoxalated polyacrylamide. Such cross-linking increases the molecular weight of the composition. The molecular weight is preferably increased sufficiently so as to obtain a desired viscosity in the range of about 30 to about 80 cPs at 25° C. for a 20 weight % solids solution. Those skilled in the art will appreciate a suitable extent of crosslinking to obtain such a result.

Acid Quenching

As a desired viscosity is attained, the rate of the glyoxalation reactions and related cross-linking reactions can be slowed and eventually substantially terminated by acid quenching.

For better control of the glyoxalation reactions, a two step quenching procedure can be used. For example, the glyoxalation can start at a pH at the higher end of the pH range suitable for the glyoxalation reaction in order to obtain a higher reaction rate. In order to control the reaction rate, at a certain extent of conversion short of the desired end-point, the pH then is reduced by adding an acid to the reaction mixture (first acid quench to $7.0 \leq pH \leq 7.4$). The reaction then continues at a reduced rate. After a final desired viscosity is reached, a second acid quench is used to reduce the pH further ($3 \leq pH \leq 3.5$) and to substantially terminate the glyoxalation reactions.

It is preferred that the pH of the aqueous reaction system be adjusted to the range of 3 to 5 through addition of an acid. The acid added to the glyoxalated polyacrylamide can be either a mineral acid (such as hydrochloric acid, sulfuric acid, phosphoric acid and the like) or an organic acid like formic acid, acetic acid, citric acid, malic acid, lactic acid and the like.

A procedure for determining the amount of bound glyoxal in the glyoxalated polymer is described in Biochemistry, Vol. 81, pp. 47-56 (1977), which is incorporated by reference herein. Additional details on suitable reaction conditions for binding glyoxal to the primary vinylamide also are described in U.S. Pat. No. 3,556,932, which is also incorporated by reference.

Glyoxal Post-Addition

Following the acid quench, an optional second portion of glyoxal is then preferably added to the composition to enhance its stability. The amount of glyoxal added in the second portion is about 1% to about 75% by weight of the first portion of glyoxal, more usually between about 4 and about 50 weight percent. By increasing the amount of free-glyoxal in the composition at this point, an equilibrium is established that reduces the tendency of the composition to undergo further cross-linking before use, e.g., on shipping and storage. The glyoxalated polyacrylamide composition thus exhibits an improved stability because of the glyoxal post-addition.

The stability enhancement produced by the two-step glyoxal addition cannot be obtained simply by adding a higher amount of glyoxal in the first portion. The kinetics of the glyoxalation reactions, in the presence of a higher initial amount of glyoxal, precludes the obtainment of a proper balance between molecular weight (extent of cross-linking) and residual free glyoxal that results in the higher level of stability observed for the present composition.

Buffers

Further stability enhancement of the polyacrylamide composition is obtained by adding to the glyoxalated polyacrylamide composition a buffer that regulates (stabilizes) the pH of the glyoxalated polyacrylamide composition between about 3 and 3.5. One suitable buffer is a mixture of 20 parts by volume of a 0.2 M sodium hydroxide with 100 parts by volume of a stock solution containing 0.4 M acetic acid, 0.4 M phosphoric acid, and 0.4 M boric acid. This buffer is used in the following examples and has been shown to keep the pH of the glyoxalated polyacrylamide composition relatively constant over a period of at least six weeks.

Other buffers that could be used include materials that simultaneously function as both a weak acid and a weak base, such as citric acid with sodium citrate, disodium phosphate with citric acid, succinic acid with borax, acetic acid with sodium acetate, monopotassium phthalate with hydrochloric acid, bicarbonates, carbonate esters, complex carbonate salts of organic acids, hydrogen phosphates, phosphate esters, phosphinate esters, borates, borate esters, hydrogen sulfates, sulfinates, and sulfate esters.

Other examples of suitable buffers include potassium bicarbonate, potassium biphthalate, potassium bisulfate, potassium dihydrogen citrate, dipotassium hydrogen citrate, potassium dihydrogen phosphate, dipotassium hydrogen phosphate, potassium hydrogen tartrate, potassium hydrogen oxolate, potassium hydrogen maleate, potassium hydrogen succinate, potassium hydrogen glutarate, potassium hydrogen adipate, potassium tetraborate, potassium pentaborate, potassium octaborate and all the corresponding sodium salts, complex calcium carbonate salts of organic acids (such as octanoic acid, iso-octanoic acid, 2-ethyl hexanoic acid, hexanoic acid, and the like) and other similar materials known in the art.

Further Stabilization Using an Aldehyde Scavenger

Yet another improvement to the stability of the composition is garnered by adding one or more aldehyde scavengers to the glyoxalated polyacrylamide or at one or more of its preparation steps. The stability of the glyoxalated polyacrylamide depends upon a balance between the free glyoxal in the composition and the reactive pendant aldehyde and other functional groups. In order to reduce the reactivity of the aldehyde and other functional groups, a mono-functional aldehyde scavenger material preferably of a low volatility (high boiling point) is used.

Compounds with a single hydroxyl group such as lactic acid, malic acid, citric acid, choline chloride and the like can be used. Such aldehyde scavengers are present in an amount of about 0.0001 to 0.25 mole per mole of glyoxal added in both the first and second portions (the total glyoxal amount), preferably in an amount of 0.01 to about 0.15 mole per mole of total glyoxal, in preparing the glyoxalated polyacrylamide composition. In the presence of such a scavenger, the pH tends to remain constant and the shelf-life of the composition tends to be increased further. The longer storage life of the stabilized product allows the glyoxalated polyacrylamide composition to be stored at a higher concentration (no dilution is required) and the only dilution that needs to be taken into account is at the wet end of the paper process.

Preferred Aldehyde Scavengers

Preferred aldehyde scavengers are adducts of choline or a choline salt and an acrylamide monomer and have the structure shown below:

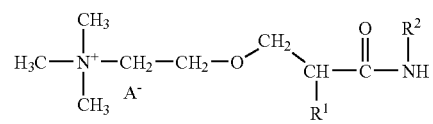

The "acrylamide monomer" is a monomer of a primary vinylamide, including not only acrylamide itself but also substituted acrylamides having the formula:

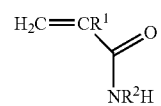

wherein $R^1$ is hydrogen or $C_1$-$C_2$ alkyl and $R^2$ is hydrogen or $C_1$-$C_4$ alkyl.

"$A^-$" is a compatible anion such as hydroxyl or any negatively charged ion which can form a salt with choline (e.g., chloride).

Preferred aldehyde scavengers are much more efficient than scavengers which contain a hydroxyl group. In addition, preferred aldehyde scavengers can provide supplementary cationic charges for the polymer backbone because any reaction between an aldehyde pendant group and the adduct will result in an additional cationic charge on an acrylamide polymer or copolymer.

An adduct of choline chloride and acrylamide (ethanaminium, 2-(3-amino-3-oxopropyl)-N,N,N-trimethyl-, chloride) is a particularly preferred aldehyde scavenger:

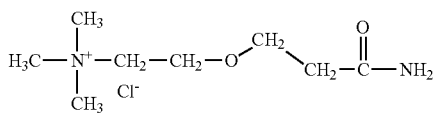

Preparation of Preferred Aldehyde Scavengers

Preferred aldehyde scavengers are prepared by reacting choline or a choline salt with an acrylamide monomer, as shown below:

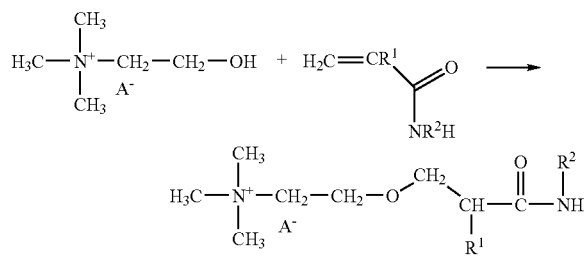

Preferred aldehyde scavengers can be prepared, for example, through a Michael addition reaction. The Michael addition can be performed in an aqueous solution containing about 2.5% by weight sodium hydroxide at a temperature in the range of 70° to 100° C. The molar ratio between the choline or choline salt and the acrylamide monomer can be in the range of 1:1 to 1:0.5 with the solids content of the reactants between about 25 to 70 wt. %. In such reactions, the acrylamide conversion to aldehyde scavenger is higher than 95% (based on free acrylamide concentration measurements). The resultant preparation can be used without further purification.

Addition of Aldehyde Scavengers

One or more aldehyde scavengers, including preferred aldehyde scavengers, can be added to a glyoxalated polyacrylamide composition and/or during one or more steps in the preparation of a glyoxalated polyacrylamide composition. Preferred aldehyde scavengers also can be added during polymerization of the base polyacrylamide. The longer storage life of the resultant stabilized product allows the glyoxalated polyacrylamide composition to be stored at a higher concentration (no dilution is required), and the only dilution that needs to be taken into account is at the wet end of the paper process. Thus, shipping and storage costs associated with such stabilized compositions are generally lower than with prior art compositions.

Addition of a Preferred Aldehyde Scavenger During Polymerization of the Base Polyacrylamide Not all acrylamide monomers form an adduct between the choline or choline salt during preparation of an aldehyde scavenger. Unless further purified, a preparation of aldehyde scavenger will contain free acrylamide monomers. If such a preparation is present during polymerization of a base polyacrylamide, the free acrylamide monomers will be incorporated into the base polyacrylamide, and the aldehyde scavenger will already be present when glyoxalation of the base polyacrylamide begins; presence of the aldehyde scavenger at that point can increase the density of positive charges on the glyoxalated polyacrylamide, as described below.

If added during polymerization of a base polyacrylamide, the preferred aldehyde scavenger typically is present in an amount ranging from about 0.7 mole to about 1.5 mole percent based upon total acrylamide monomer.

Addition of a Preferred Aldehyde Scavenger During and at the Beginning of Glyoxalation Some wet strength arises from cationic charges binding with anionic sites on cellulose. If this binding is disrupted, the polymer chain will be free and unable to impart wet strength to paper. Adding one or more preferred aldehyde scavengers at the beginning of glyoxalation increases the number of cationic charges on the polyacrylamide backbone, thereby increasing the ability of the glyoxalated polyacrylamide to impart wet strength to paper.

During glyoxalation, free (un-reacted) glyoxal is in equilibrium with glyoxalated pendant amide groups on the base polyacrylamide. If a preferred aldehyde scavenger is present, free preferred aldehyde scavenger is in equilibrium with adducts between the scavenger and glyoxalated pendant amide groups on the base polyacrylamide. The free preferred aldehyde scavenger slows down the reaction between unglyoxalated pendant amide groups and free glyoxal. These embodiments of the invention provide a copolymer with cationic charges as pendant groups which are bonded to the backbone through breakable bonds. Thus, a glyoxalated polyacrylamide composition having a higher positive charge density is obtained than if the preferred aldehyde scavenger had not been present. Such compositions have a greater affinity for cellulose fibers than compositions prepared using other, non-charged scavengers.

Because the preferred aldehyde scavenger provides cationic charges to the glyoxalated polyacrylamide in these embodiments, the base polyacrylamide need not be polymerized with cationic co-monomers. Thus, the base polyacrylamide can be a polyacrylamide homopolymer or can be a copolymer with a cationic co-monomer but at a lower concentration of cationic co-monomer than described in paragraph [16], above.

If added at the beginning of glyoxalation, a preferred aldehyde scavenger preferably is present in an amount ranging from about 0.7 to about 1.5 mole for each mole of total glyoxal.

If desired, one or more preferred aldehyde scavengers can be included at any point during glyoxalation (i.e., before the acid quench). The resultant glyoxalated product has a longer shelf life. In addition, the endpoint of the glyoxalation reaction can be better controlled.

If added during the glyoxalation reaction, a preferred aldehyde scavenger preferably is present in an amount ranging from about 0.1 to about 0.5 mole for each mole of total glyoxal.

Addition of Preferred Aldehyde Scavengers After Glyoxalation

A preferred aldehyde scavenger can be added after initial glyoxalation (i.e., during or after the acid quench). Addition of an aldehyde scavenger after glyoxalation also results in a longer shelf life for the final stabilized glyoxalated polyacrylamide composition.

If added during the acid quench, a preferred aldehyde scavenger preferably is present in an amount ranging from about 0.01 to about 0.15 mole for each mole of total glyoxal.

If added after the acid quench, a preferred aldehyde scavenger preferably is present in an amount ranging from about 0.01 to about 0.3 mole for each mole of glyoxal.

Addition to Glyoxalated Polyacrylamide Compositions (e.g., "Post-Glyoxal Addition")

The pH tends to remain constant and the shelf-life of the composition tends to be increased further in the presence of aldehyde scavengers, including preferred aldehyde scavengers. The glyoxalated polyacrylamide compositions can be prepared as described above or by any other means of preparing glyoxalated polyacrylamides known in the art.

As described above, stabilized glyoxalated polyacrylamides can be prepared by adding a second portion of glyoxal after the acid quench. Aldehyde scavengers, particularly preferred aldehyde scavengers, also provide enhanced stability to these stabilized glyoxalated polyacrylamides. For example, the shelf life for a stabilized glyoxalated polyacrylamide prepared as described above but without any scavenger is about 20 days at room temperature. When citric acid, a known aldehyde scavenger, was added after glyoxal post-addition, the shelf life increased to about 40 days at room temperature. When a preferred aldehyde scavenger (ethanaminium, 2-(3-amino-3-oxopropyl)-N,N,N-trimethyl-, chloride) was added after glyoxal post-addition, the glyoxalated polyacrylamide increased to about 60 days at room temperature. Significant improvements in both initial wet strength and decay rate were obtained using this scavenger.

If added to a glyoxalated polyacrylamide composition, a preferred aldehyde scavenger preferably is present in an amount ranging from about 0.01 to about 0.3 mole for each mole of glyoxal.

Polymeric Paper Strengthening Agent

Compositions of the invention also include one or more polymeric paper strengthening agents, preferably wet strengthening agents, blended with the stabilized glyoxalated polyacrylamide. The polymeric paper strengthening agent can be a cationic polymer, an anionic polymer, or a neutral polymer; it can be a homopolymer or a copolymer; and it can be water soluble or water dispersible. The polymeric paper strengthening agent can be, for example, another temporary or a permanent wet strengthening agent. Permanent-type wet strengthening agents are preferred.

Numerous cationic paper strengthening agents are known in the art and include dialdehyde starch, polyethylemeimine, mannogalactan gum, and dialdehyde mannogalactan. See, e.g., U.S. Pat. No. 5,427,652. Preferred cationic polymeric paper strengthening agents used in compositions of the invention include thermosetting cationic polyamine or polyamide wet-strength resins which are commonly used in papermaking. Most of these resins are reaction products of polyamines and polyamides with halohydrins, such as epichlorohydrin. Illustrative examples of the polyamine, cationic wet-strength resins are those described in U.S. Pat. Nos. 2,926,154; 2,969,302; 3,248,353; 3,269,852; 3,224,990; 3,248,280; 3,372,086; 3,556,932; 4,217,425; 4,603,176; 4,605,702; 4,853,431; 5,427,652; 5,466,377; 5,567,798; 5,674,362; 5,723,022; 5,783,041; 6,077,394; 6,429,253; and RE 26,018.

Preferred cationic polymers include, but are not limited to, poly(diallyl dimethyl ammonium chloride) (polyDADMAC), polyamidoamine (prepolymer), polyamidoamine-Epi (AMRES®), DADMAC copolymers, cationic styrene maleic anhydride (SMA), cationic latexes, and mixtures thereof. Particle cores for cationic latexes can be made by polymerization or copolymerization of any hydrophobic monomer (e.g., styrene, butyl acrylate or any other acrylic ester, methyl methacrylate or any other methacrylic ester, etc.). Cationic latexes can be stabilized by a cationic emulsifier or can be "self-stabilized" (if a cationic monomer is involved in the free-emulsifier emulsion copolymerization).

Preferred anionic polymers include acrylamide-acrylic acid copolymers, styrene acrylic acid copolymers, styrene maleic anhydride copolymers, styrene-acrylic acid—hydroxyethyl acrylate copolymers, carboxymethylcellulose (CMC), anionic latex, and mixtures thereof.

Neutral polymers include polyvinyl alcohol, starch, polyhydroxyethyl acrylate, and mixtures thereof.

Preparation and Use of Paper Strengthening Compositions

Compositions of the invention typically are made by mixing one or more polymeric paper strengthening agent(s) and the stabilized glyoxalated polyacrylamide at about 20-35° C. for from about 1 to about 30 minutes. For some applications, such as for use with repulpable paper, it may be advantageous to form a composition of the invention 1, 2, or several days before using the composition to strengthen paper. The concentration of the stabilized glyoxalated polyacrylamide is within the range of about 40-99% of the combined weight of the polymeric paper strengthening agent(s) and the stabilized glyoxalated polyacrylamide by weight, based on solids. The ratio of the stabilized glyoxalated polyacrylamide and the polymeric paper strengthening agent(s) can be varied to obtain compositions with different final solids concentrations, viscosities, charge densities. A preferred aldehyde scavenger can be used to vary the number of available reactive aldehyde groups and to vary the charge density of the stabilized glyoxalated polyacrylamide. Such adjustments are within the skill of those in the art.

Compositions of the invention are readily employed in the manufacture of paper as aqueous solutions and dispersions. Generally, a composition of the invention used as a paper strengthening agent will have a solids concentration between about 5 and 25 weight percent. The compositions are not limited to treating any particular type of paper and should find application in Kraft paper, sulfite paper, semichemical paper, and the like, including paper produced using both bleached and unbleached pulps. Compositions of the present invention are extremely effective for developing wet strength in facial tissue, napkins, towels, carrierboard, liquid packaging, bag paper, linerboard medium and other specialty papers.

When using a composition of this invention in papermaking, it can be added at any time before, during or after the paper is formed. The composition is conveniently added at the wet end of a paper-making facility to the dilute cellulose fiber suspensions, normally at a point when wet strength resins are conventionally added. Alternatively, a composition of the present invention can be added to a previously prepared paper by padding, spraying, immersing, printing and the like.

Compositions of this invention can be added to paper pulp over a wide range of pH values. However, best results are obtained by adding the composition to the paper pulp at a pH of from about 4.5 to about 8.0, most preferably from about 4.5 to about 7.0. Compositions of the present invention are readily absorbed by the cellulose fibers at these pH values.

The amount of a composition of this invention added can be as low as about 0.05% of the dry weight of the cellulose fibers, but usually does not exceed about 0.5% by weight. An amount in the range of 0.2% to 0.4% of the dry paper weight is more usual.

All patents, patent applications, and references cited in this disclosure are expressly incorporated herein by reference. The above disclosure generally describes the present invention. A more complete understanding can be obtained by reference to the following specific examples, which are provided for purposes of illustration only and are not intended to limit the scope of the invention.

EXAMPLE 1

Base Polymer Synthesis

A suitable 2 liter glass reactor was fitted with a stirring apparatus, thermometer, a nitrogen inlet, a condenser and then placed in a heating bath. The reactor was charged with 370 g of water, 190 g of a base acrylamide solution (50% concentration), 0.9 g of N,N'-methylene bisacrylamide, 11 g of 2-mercaptoethanol and 123 g of a DADMAC solution (63% concentration). The reactor was then heated to 80° C. at which time an additional monomer feed and the initiator solution feed were continuously and slowly added to the reactor over 145 minutes and 160 minutes respectively. The monomer feed consists of a mixture of 850 g of a base acrylamide solution (50% concentration), 4.1 g of N,N'-methylene bisacrylamide and 49 g of 2-mercaptoethanol. The initiator feed consists of a mixture of 3.2 g of ammonium persulfate and 150 g of water. After the addition of the two feed streams was completed, the temperature was maintained at 80° C. for an additional 30 minutes. To lower the un-reacted base acrylamide concentration t-butyl hydroperoxide (0.7 g of a 70% aqueous solution and sodium formaldehyde sulfoxylate (0.3 g) were added. The final solution has a solids concentration of 41%, a pH of 3.3 and a viscosity of 25 cPs at 25° C.

EXAMPLE 2

Base Polymer Synthesis

The same procedure as in Example 1 was used, except the reactor was charged initially with 220 g of water, 196 g of an acrylamide solution (50% concentration), 4 g of 2-mercaptoethanol and 120 g of a DADMAC solution (63% concentration). The reactor was then heated to 80° C. at which time the monomer feed and the initiator solution feed were continuously and slowly added to the reactor over 145 minutes and 160 minutes respectively. In this case, the monomer feed consists of a mixture of 800 g of an acrylamide solution (50% concentration) and 16 g of 2-mercaptoethanol. The initiator feed consists of a mixture of 5.0 g of ammonium persulfate and 150 g water. The final solution has a solids concentration of 44%, a pH of 3.2 and a viscosity of 175 cPs at 25° C.

EXAMPLE 3

Base Polymer Synthesis

The same procedure as in Example 1 and 2 was used. The reactor was charged initially with 370 g of water, 190 g of a base acrylamide solution (50% concentration), 0.9 g of N,N'-methylene bisacrylamide, and 11 g of 2-mercaptoethanol. The reactor was then heated to 80° C. at which time the monomer feed and the initiator solution feed were continuously and slowly added to the reactor over 145 minutes and 160 minutes respectively. The monomer feed consists of a mixture of 850 g of an acrylamide solution (50% concentration), 4.1 g of N,N'-methylene bisacrylamide and 49 g of 2-mercaptoethanol. The initiator feed consists of a mixture of 3.2 g of ammonium persulfate and 150 g of water. After the 60-minute addition time, 123 g of a DADMAC solution (63% concentration) was quickly charged in one shot. After the monomer and initiator additions were completed, the temperature was maintained at 80° C. for an additional 30 minutes. To lower the un-reacted acrylamide concentration, t-butyl hydroperoxide (0.7 g of a 70% aqueous solution and sodium formaldehyde sulfoxylate (0.3 g) were added. The final solution has a solids concentration of 41%, a pH of 3.5 and a viscosity of 30 cPs at 25° C.

EXAMPLE 4

Polyacrylamide Glyoxalation

A suitable 4 liter glass reactor (with condenser) was fitted with a jacketed beaker connected to a circulated, constant temperature water bath. In the reactor, 1459 g of the base polymer (41% solids, obtained according to Example 1) was dissolved easily in 1077 g of water, followed by the addition of 354 g of a 40% weight glyoxal solution. The reactor was then heated to 30° C. The solution was adjusted to pH 8 by addition of 1N sodium hydroxide, as required. There was then added an aqueous sodium phosphate buffer (pH of 8.0) 333 g of an 8.85% concentration. The temperature was maintained at 30° C. for the entire reaction. The pH of the solution was maintained at 8.0 by appropriately adding 0.1N sodium hydroxide continuously. As soon as the Brookfield viscosity of the reaction solution reached 12 cPs, the addition of sodium hydroxide was stopped and the pH was lowered to 7.2 by adding 4.78 g of an aqueous 35% weight sulfuric acid solution. The pH of the reaction solution consequentially stayed in the range of from 7.2 to 7.1 to keep the reaction progressing at a moderate rate. When the polymer reaction solution reached a Brookfield viscosity of 54 cPs, the pH of the reaction solution was adjusted to a pH of 3.5 with the addition of 25.7 g of a 35% weight aqueous sulfuric acid solution to quench the reaction. Then, there was added a boric acid-based acidic buffer (pH of 3.3) in an amount of 68 g (8.65% aqueous concentration). To the resulting polymer was post-added an additional 15 g of a 40% glyoxal aqueous solution and 201 g of a 25% weight citric acid aqueous solution. The pH of the final glyoxalated polymer solution was adjusted to 3.3 by the addition of 1N sodium hydroxide and the solids concentration was adjusted to 20% with dilution water. The final resin is cationic and water soluble, has a solids concentration of 20 wt. %, has a cationic charge density of about 0.24 meq/gm, a pH of 3.3 and a viscosity of 22.5 cPs at 25° C.

EXAMPLE 5

Polyacrylamide Glyoxalation

The same procedure as in Example 4 was used, except the reactor was charged with 295 g of a 40% weight glyoxal aqueous solution, and to the acid-quenched polymer was post-added 74 g of a 40% weight glyoxal aqueous solution. The final resin has a solids concentration of 20 wt. %, a cationic charge density of about 0.23 meq/gm, a pH of 3.3 and a viscosity of 23.8 cPs at 25° C.

EXAMPLE 6

Polyacrylamide Glyoxalation

A suitable 1 liter glass reactor (with condenser) was fitted with a jacketed beaker connected to a circulated constant temperature water bath. In the reactor, 210 g of the base polymer (44% solids, obtained according to Example 2) dissolved easily in 144 g of water, followed by the addition of 23.5 g of a 40% weight glyoxal aqueous solution. The reactor was then heated to 30° C. The reaction solution was adjusted to a pH of 8 by the addition of 1N sodium hydroxide, as required. There was then added a sodium phosphate buffer (pH of 8) in the amount of 63.1 g of a 7.45% concentration aqueous solution. The temperature was maintained at 30° C. for the entire reaction. The pH of the solution was maintained at 8 by continuously adding 0.1N sodium hydroxide as necessary. As soon as the Brookfield viscosity of the reaction solution reached 15 cPs, the addition of sodium hydroxide was stopped and the pH was lowered to 7.2 by adding 0.9 g of a 35% weight sulfuric acid aqueous solution. The pH of the reaction solution consequentially stayed in the range of from 7.2 to 7.1 to keep the reaction progressing at a moderate rate. When the polymer reaction solution reached a Brookfield viscosity of 55 cPs, the pH of the reaction solution was lowered to a pH of 3.5 with 6.06 g of a 35% weight sulfuric acid aqueous solution to quench the reaction. There was then added a boric acid based acidic buffer (pH of 3.3) in an amount of 10.9 g of an 8.65% concentration aqueous solution. To the resulting polymer were post-added 11.7 g of a 40% glyoxal aqueous solution and 20 g of a 25% weight citric acid aqueous solution. The pH of the resulting glyoxalated polymer was finally adjusted to 3.3 by the addition of 1N sodium hydroxide and the solids concentration was adjusted to 20% with dilution water. The final resin is cationic and water-soluble, has a solids concentration of 20 wt. %, a cationic charge density of 0.43 meq/gm, a pH of 3.3 and a viscosity of 26.5 cPs at 25° C.

EXAMPLE 7

Procedure for Evaluation of Temporary Wet Strength Resins

Preparation of Handsheets

The pulp stock used in the handsheet work was unrefined, and comprised a blend of 60% hardwood bleached Kraft pulp and 40% softwood bleached Kraft pulp. The stock freeness was in a range of 650 to 680 CSF. The stock pH was 6.8 throughout the process. The temporary wet strength resin (glyoxalated polyacrylamide) was added in an amount of 5 lb/ton of pulp solids to a 1% consistency diluted stock allowing a 2-minute mixing time (1000 rpm of mixing speed). The treated stock was immediately poured into the headbox of the Noble & Wood handsheet machine containing pH pre-adjusted water (pH of 6.8). The standard operating procedure for the Noble & Wood handsheet machine was carried out for each set of handsheets. The target sheet basis weight was 28 lb/3000 ft$^2$. Each wet sheet was given two passes through the full load wet press and then placed on the 105° C. drum dryer without the blotter for 1 minute. All sets of handsheets were further cured for 3 minutes at 105° C. in a forced air oven. The handsheet samples were conditioned at a constant humidity (50%) and at a constant temperature (73° F.) (23° C.) for 24 hours prior to testing. Dry tensile, Finch cup wet tensile in 5 seconds and 5 minutes of soaking time were tested to measure improved tissue temporary wet strength performance.

Dry Tensile Measurement

Each handsheet was trimmed to the size of 11"×11" and weighed to get the basis weight of each sheet. Ten strips (1 inch wide) per sheet were cut on the Thwing-Albert J.D.C. precision sample cutter. The standard operating procedure for the Thwing-Albert tensile tester then was carried out for each strip. The following calculation was done to obtain the dry tensile breaking length, Km (refer to TAPPI Test Method T494 om-88):

$$\text{Dry Breaking Length} = 102{,}000 * (T/R)$$

Where T=tensile strength (the average breaking force by the specimen width), kN/m and R=basis weight, g/m$^2$ Wet Tensile Measurement Again, the sheet was trimmed and weighed. Ten strips were prepared on the J.D.C. cutter. Each 1 inch-wide strip was placed in the Finch Cup Tester clamped in the Thwing-Albert tensile tester. The test sample was pulled after the desired soaking time (5 seconds and 5 minutes) using the Finch Cup. The wet breaking length calculations are the same as the dry breaking length calculation listed above. Each handsheet's wet and dry tensile ratio and wet strength decay rate after 5-minutes soaking time were calculated using the following formulae:

$$W/D(\%) = WT_{(5\ seconds)}/DT \times 100$$

$$\text{5-Min. Decay Rate}(\%) = [1 - WT_{(5\ Min.)}/WT_{(5\ seconds)}] \times 100$$

where
DT=dry breaking length
$WT_{(5\ seconds)}$=5-seconds Finch cup breaking length
$WT_{(5\ minutes)}$=5-minutes Finch cup breaking length The two resins (Example 4 and Example 5) were compared with Bayer PAREZ® 745 resin with the results as reported in the following Table:

TABLE 1

| Sample | Resin Stability Time to gel at 35° C. (Days) | Handsheet Strength Results | |
| --- | --- | --- | --- |
| | | W/D Tensile Ratio | % Functional Wet Strength Lost in 5 Minutes |
| Bayer PAREZ ® 745* | 14 | 13.5 | 46 |
| Example 4 | 33 | 18.1 | 56 |
| Example 5 | 40 | 16.2 | 50 |

EXAMPLE 8

Procedure for Evaluation of Dry Strength Resins

The pulp stock used in the handsheet work was 100% OCC furnish from a linerboard paper mill. The stock freeness was in a range of 550 to 530 CSF. The stock pH was pre-adjusted to 7.5 by using 1N sodium hydroxide before the addition of the additives. The dry strength resin was added to a 3% consistency thick stock allowing a 2-minute mixing time (1000 rpm of mixing speed). The thick stock was immediately diluted to 1% consistency and there was then added 2 lb/ton of an AKD size (NovaSize 3016) with 10 lb/ton of a cationic wet end starch (STA-LOK® 360) to simulate the OCC linerboard paper machine wet end chemistry condition. The stock was mixed for 2 minutes and poured into the headbox of the Noble & Wood handsheet machine containing water pre-adjusted to a pH of 7.5. The papermaking pH was controlled in a range of 7.5 to 8. The standard operating procedure for the Noble & Wood handsheet machine was carried out for each set of handsheets. The target sheet basis weight was 42 lb/1000 ft². Each wet sheet was given two passes through the full load wet press and then placed on the 105° C. drum dryer without the blotter for 5 minutes. All sets of handsheets were cured for 3 minutes at 105° C. in a forced air oven. The handsheet samples were conditioned for 24 hours using the same conditions as in Example 7 prior to testing. Dry tensile and Scott plybond were tested to measure improved dry strength performance.

Dry Tensile Strength

The same procedure as reported in Example 7 was used.

Scott Bond

The internal Scott Bond is a test that measures the energy required to rapidly delaminate a sheet-type specimen (refer to TAPPI Provisional Method T569 pm-00).

The paper dry strength performance of the resin (Example 6) was shown by an alkaline linerboard OCC handsheet study with 10% dry tensile, 39% internal Scott bond gains over the waterleaf handsheet condition. Example 6 was tested and was shown to have an equivalent dry tensile strength and internal Scott bond to PAREZ® 631 and HERCOBOND® 1000. But, the resin of the present invention was seen to have a significant improvement in resin solids, cationic charge and resin stability over the two competition products as presented below:

TABLE 2

| Sample | Resin Stability Time to gel at 35° C. (Days) | Resin Solids, % | Cationic Charge, meq/gram |
|---|---|---|---|
| Parez 631 (Bayer) | 4 | 10 | 0.25 |
| Hercobond 1000 | 9 | 8 | 0.34 |
| Example 6 | 20 | 20 | 0.43 |

The accelerated stability tests were conducted at 35° C. Experience indicates that a composition will exhibit a shelf life of two to three times the period it takes the composition to gel at 35° C.

As these data show, by employing the method of the present invention for modifying the glyoxalated polyacrylamide composition, a composition of equivalent paper strengthening quality, as compared with the prior art, is obtained; while providing a composition of significantly improved stability and other properties.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and preferably is only about + or −2%.

While the invention has been described in conjunction with specific embodiments thereof, the foregoing description and examples are intended to illustrate, but not limit the scope of the invention. Other aspects, advantages and modifications will be apparent to those skilled in the art to which the invention pertains. These aspects and modifications are within the scope of the invention, which is limited only by the appended claims.

The invention claimed is:

1. A composition for enhancing the wet strength of paper comprising a blend of two components:
   (a) a polymeric paper strengthening agent; and
   (b) a stabilized glyoxalated polyacrylamide in a concentration of between about 40% and about 99% by weight of the two components, wherein the stabilized glyoxalated polyacrylamide is prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide.

2. The composition of claim 1 wherein the polyacrylamide is prepared by free radical polymerization of an acrylamide monomer in the presence of a cationic co-monomer to produce a cationic polyacrylamide polymer.

3. The composition of claim 2 wherein the cationic co-monomer is selected from diallyl dimethyl ammonium chloride, 2-vinylpyridine, 4-vinylpryridine, 2-methyl-5-vinylpyridine, 2-vinyl-N-methylpyridinium chloride, p-vinylphenyltrimethyl ammonium chloride, 2-(dimethylamino) ethyl methacrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate, 3-acrylamido-3-methylbutyl trimethyl ammonium chloride, 2-(dimethylamino) ethyl acrylate, and mixtures thereof.

4. The composition of claim 1 wherein the polyacrylamide is prepared in the presence of a di-functional monomer to obtain a branched structure.

5. The composition of claim 4 wherein the di-functional monomer is selected from the group consisting of N,N'-methylene-bisacrylamide, N,N'-methylene-bismethacrylamide, N-allyl acrylamide, N-allyl methacrylamide and mixtures thereof.

6. The composition of claim 1 wherein the first portion of glyoxal is provided in an amount of 10 to 60 mole percent of the pendant amide groups.

7. The composition of claim 6 wherein the second portion of glyoxal is from about 1 about 75 weight percent of the first portion of glyoxal.

8. The composition of claim 6 wherein the second portion of glyoxal is from about 4 to about 50 weight percent of the first portion of glyoxal.

9. The composition of claim 1 further comprising an aldehyde scavenger.

10. The composition of claim 1 wherein an aldehyde scavenger is included in one or more of step (1), step (2), step (3), and the stabilized glyoxalated polyacrylamide.

11. The composition of claim 9 or 10 wherein the aldehyde scavenger is selected from the group consisting of lactic acid, malic acid, citric acid, and choline chloride.

12. The composition of claim 9 or 10 wherein the aldehyde scavenger is used in an amount of 0.0001 to 0.25 mole per mole of total glyoxal.

13. The composition of claim 9 or 10 wherein the aldehyde scavenger has the structure:

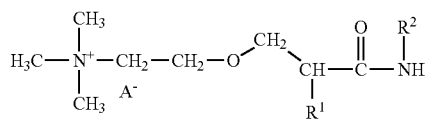

wherein:
$R^1$ is hydrogen or $C_1$-$C_2$ alkyl;
$R^2$ is hydrogen or $C_1$-$C_4$ alkyl; and
$A^-$ is a compatible anion.

14. The composition of claim 13 wherein $R^1$ and $R^2$ are each hydrogen and $A^-$ is chloride.

15. The composition of claim 13 wherein the aldehyde scavenger is used in an amount of about 0.01 to about 0.3 moles per mole of glyoxal.

16. The composition of claim 13 wherein the aldehyde scavenger is used in an amount of about 0.1 to about 0.5 moles per mole of glyoxal.

17. The composition of claim 13 wherein the aldehyde scavenger is used in an amount of about 0.7 to about 1.5 moles per mole of glyoxal.

18. The composition of claim 13 wherein the polymeric paper strengthening agent is a polymeric wet strengthening agent.

19. The composition of claim 18 wherein the polymeric wet strengthening agent comprises a copolymer.

20. The composition of claim 18 wherein the polymeric wet strengthening agent comprises a homopolymer.

21. The composition of claim 18 wherein the polymeric wet strengthening agent comprises one or more of a cationic polymer, an anionic polymer, and a neutral polymer.

22. The composition of claim 21 wherein the polymeric wet strengthening agent comprises a cationic polymer and the cationic polymer is selected from the group consisting of poly(diallyl dimethyl ammonium chloride) (polyDADMAC), polyamidoamine (prepolymer), polyamidoamine-Epi (AMRES®), a DADMAC copolymer, a cationic styrene maleic anhydride (SMA), a cationic latex, and mixtures thereof.

23. The composition of claim 21 wherein the polymeric wet strengthening agent comprises an anionic polymer and the anionic polymer is selected from the group consisting of an acrylamide-acrylic acid copolymer, a styrene acrylic acid copolymer, a styrene maleic anhydride copolymer, a styrene-acrylic acid-hydroxyethyl acrylate copolymer, carboxymethylcellulose (CMC), an anionic latex, and mixtures thereof.

24. The composition of claim 21 wherein the polymeric wet strengthening agent comprises a neutral polymer and the neutral polymer is selected from the group consisting of polyvinyl alcohol, a starch, polyhydroxyethyl acrylate, and mixtures thereof.

25. A composition for enhancing the wet strength of paper comprising a blend of two components:
(a) a polyamidoamine-Epi polymer; and
(b) a stabilized glyoxalated polyacrylamide in a concentration of between about 40% and about 99% by weight of the two components, wherein the glyoxalated polyacrylamide is prepared by (1) reacting a first portion of glyoxal with a polyacrylamide having pendant amide groups to form a first reaction mixture comprising glyoxalated polyacrylamide; (2) adding an acid to the first reaction mixture to form a second reaction mixture having a reduced pH and comprising the glyoxalated polyacrylamide; and (3) adding a second portion of glyoxal to the second reaction mixture to form the stabilized glyoxalated polyacrylamide.

26. The composition of claim 25 wherein an aldehyde scavenger having the structure:

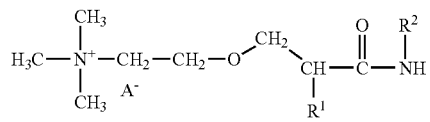

is included in one or more of step (1), step (2), step (3), and the stabilized glyoxalated polyacrylamide.

27. The composition of claim 26 wherein $R^1$ and $R^2$ are each hydrogen and $A^-$ is chloride.

28. Paper strengthened with the composition of claim 25.

29. Paper strengthened with the composition of claim 1.

30. A method for imparting wet strength to paper comprising adding the composition of claim 1 to a pulp slurry from which the paper is formed.

31. A method for imparting wet strength to paper comprising adding the composition of claim 25 to a pulp slurry from which the paper is formed.

* * * * *